United States Patent
Joo et al.

(10) Patent No.: US 9,286,279 B2
(45) Date of Patent: Mar. 15, 2016

(54) BOOKMARK SETTING METHOD OF E-BOOK, AND APPARATUS THEREOF

(71) Applicant: Samsung Electronics Co., Ltd., Gyeonggi-do (KR)

(72) Inventors: Sun-Woong Joo, Gyeonggi-do (KR); Su-Mi Lee, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 299 days.

(21) Appl. No.: 13/804,330

(22) Filed: Mar. 14, 2013

(65) Prior Publication Data

US 2013/0268851 A1    Oct. 10, 2013

(30) Foreign Application Priority Data

Apr. 9, 2012    (KR) ........................ 10-2012-0036973

(51) Int. Cl.
*G06F 17/00*    (2006.01)
*G06F 17/24*    (2006.01)
*G06F 3/0488*    (2013.01)
*G06F 3/0483*    (2013.01)

(52) U.S. Cl.
CPC .............. *G06F 17/24* (2013.01); *G06F 3/0483* (2013.01); *G06F 3/0488* (2013.01)

(58) Field of Classification Search
None
See application file for complete search history.

(56) References Cited

U.S. PATENT DOCUMENTS

| | | | |
|---|---|---|---|
| 2011/0039603 A1* | 2/2011 | Kim et al. | 455/566 |
| 2011/0047460 A1 | 2/2011 | Choe | |
| 2011/0050594 A1 | 3/2011 | Kim et al. | |
| 2012/0089947 A1* | 4/2012 | Lee et al. | 715/839 |
| 2012/0159373 A1* | 6/2012 | Archer et al. | 715/776 |
| 2012/0290964 A1* | 11/2012 | Lee et al. | 715/776 |
| 2012/0311509 A1* | 12/2012 | Maggiotto et al. | 715/863 |
| 2013/0021281 A1* | 1/2013 | Tse et al. | 345/173 |

FOREIGN PATENT DOCUMENTS

| | | |
|---|---|---|
| KR | 10-2002-0072536 A | 9/2002 |
| KR | 10-2004-0052219 A | 6/2004 |
| KR | 10-2006-0119023 A | 11/2006 |
| KR | 10-2006-0130168 A | 12/2006 |
| KR | 10-2011-0019019 A | 2/2011 |

* cited by examiner

*Primary Examiner* — Keith Bloomquist
(74) *Attorney, Agent, or Firm* — Cha & Reiter, LLC

(57) ABSTRACT

The present invention relates to a bookmark setting method of an e-book, an apparatus thereof, and a medium storing program source thereof. The bookmark setting method includes: recognizing a user's operation performed on a touch screen while displaying the e-book; determining whether the recognized user's operation is an operation of folding a currently displayed subject page; and when the recognized user's operation is an operation of folding the subject page, setting the bookmark on the subject page according to predetermined criteria which in turn provides a realistic bookmarking experience as in the paper book.

16 Claims, 14 Drawing Sheets

BOOKMARK SETTING METHOD OF E-BOOK, AND APPARATUS THEREOF

CLAIM OF PRIORITY

This application claims the priority under 35 U.S.C. §119(a) to Korean Application Serial No. 10-2012-0036973, which was filed in the Korean Intellectual Property Office on Apr. 9, 2012, the entire content of which is hereby incorporated by reference.

BACKGROUND OF THE INVENTION

1. Field of the Invention

The present invention relates generally to an e-book, and more particularly, to a bookmark setting method used in an electronic-book, an apparatus thereof, and a medium storing program source thereof.

2. Description of the Related Art

Recently, with development of information communication technologies, use of various media devices such as a smart phone or the like having a touch screen is skyrocketing. Among the media devices, an e-book which generates or converts a book into an electronic document type has been increasingly used because of the convenience and general availability of the Internet made transferring electronic files much easier.

Today, improved applications related to the e-book provide various functions and provide a real book reading experiences. For example, some applications provide an effect of turning a page like in a real book and allows set a bookmark on a page which a user wants to see again.

FIG. 1 is a diagram illustrating an example of a conventionally used bookmark setting method of an e-book.

As shown in FIG. 1, when a user desires to set a bookmark on a page currently displayed page while reading the e-book, the user may set the bookmark by clicking a menu item labeled 'bookmark'.

As shown in FIG. 1, the conventional method requires a predetermined display area for displaying a selectable menu for the bookmark setting which in turn undesirably reduces the display area displaying the contents of the e-book.

Further, the conventionally method has a drawback in that a User Experience (UX) is not the same as bookmarking a real book.

SUMMARY OF THE INVENTION

Accordingly, an aspect of the present invention is to provide a scheme for setting a bookmark while securing a display area of an e-book, and to enhance a user's experience, by enabling a user to set a bookmark in a similar manner to a bookmark setting method in a real world.

A method of setting a bookmark of the e-book according to an embodiment of the present invention includes: recognizing an operation performed on a touch screen while displaying the e-book; determining whether the recognized operation is an operation of folding a currently displayed subject page; and if so, setting the bookmark on the subject page.

An apparatus of setting a bookmark of the e-book according to an embodiment of the present invention includes: a touch screen for generating an input signal detected thereon for a display; and a controller for recognizing a user's operation based on the input signal and setting a bookmark on the subject page when the recognized user's operation is determined as an operation of folding a currently displayed subject page in the e-books.

In a recording medium readable by a processor according to an embodiment of the present invention, a program for executing a method is recorded, the method including: recognizing an operation performed on a touch screen while displaying the e-book; determining whether the recognized operation is an operation of folding a currently displayed subject page; and when the recognized user's operation is an operation of folding the subject page, setting the bookmark on the subject page.

According to the present invention, it is possible to set a bookmark while securing a display area of an e-book and enabling a user to set the bookmark in a similar method as one would in a real book. Further, according to the present invention, a user may simply check a page where the bookmark is set.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF THE PRESENT INVENTION

For the purposes of clarity and simplicity, in the following description of the present invention, a detailed description of known functions and configurations incorporated herein will be omitted as it may make the subject matter of the present invention rather unclear.

As described above, according to a conventional bookmark method, there is a problem in that an area where the e-book is displayed is reduced because a specific menu for the bookmark setting must be displayed on a display area. Further, there is also a problem in that the bookmark setting method is not intuitive to a user.

Accordingly, the present invention overcomes the above-mentioned problems and provides additional advantages, by providing a scheme which enables a user to simply set the bookmark on the e-book without a display of the specific menu in a media device and without reducing the display area. Also, the user is able to quickly determine the location of the bookmark and perform a bookmark setting and its releasing operations in a simpler manner. Further, the present invention provides a scheme which enables the user to enhance a User Experience (UX) by causing a bookmark setting process to be more realistic.

In the following description of the embodiments of the present invention, the media device is assumed to include a touch screen capable of recognizing the user's operations. As used herein, a media device corresponds to, for example, a device capable of performing at least one among a recording, a marking, and a playing of a text, and has a concept (meaning) including a mobile phone, a smart phone, a navigation, a Personal Digital Assistant (PDA), a Portable Multimedia Player (PMP), a Moving Picture Experts Group Layer 3 (MP3) player, a game machine, a tablet, a netbook, a desktop computer, a notebook computer, a communication terminal or any duplex systems capable of connecting to an internet, and a communication terminal capable of receiving a broadcast.

Hereinafter, exemplary embodiments of the present invention will be described with reference to the accompanying drawings.

Figure 2:
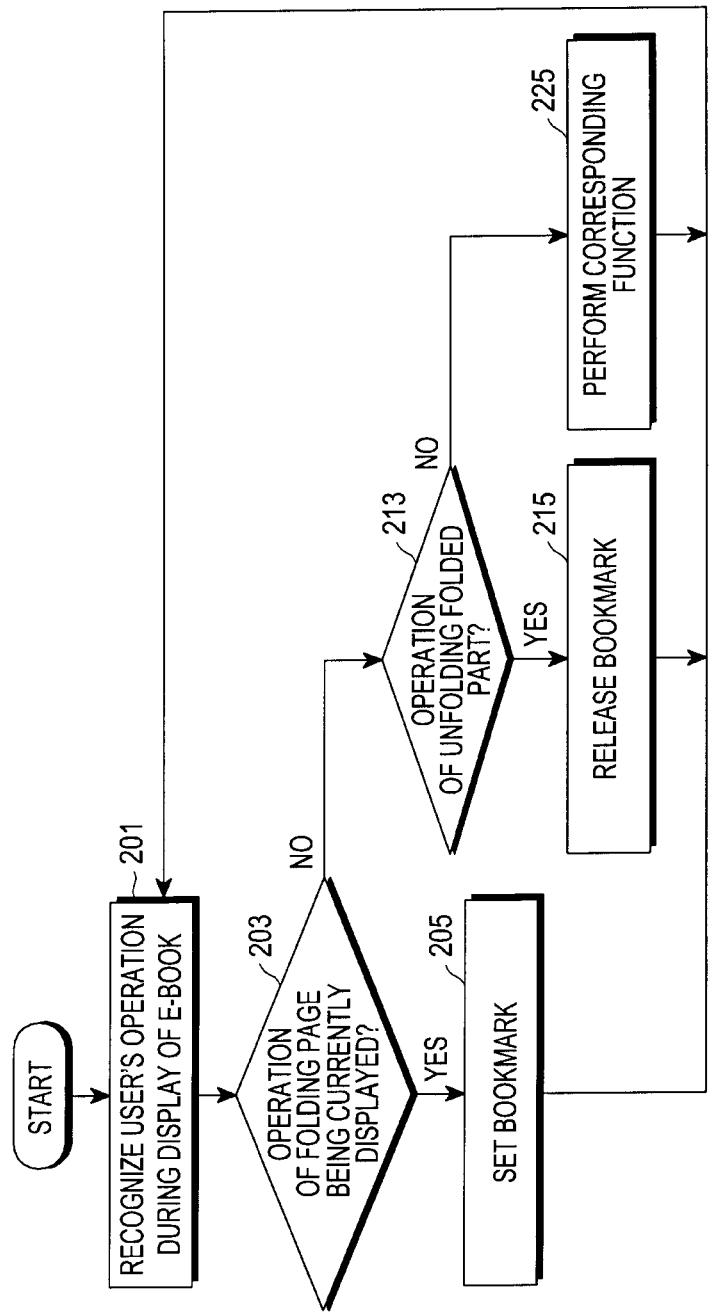
FIG. 2 is a flowchart illustrating a schematic flow of a bookmark setting method according to an embodiment of the present invention.

First, referring to FIG. 2, a schematic flow of a bookmark setting method according to an embodiment of the present invention will be described.

In step 201, the media device according to the embodiment of the present invention recognizes the user's operation on the touch screen during the display of the e-book, and then proceeds to step 203.

In step 203, the media device determines whether the user's operation recognized in step 201 is an operation of folding a page being currently displayed. When it is determined that the user's operation is the operation of folding the currently displayed page, the media device proceeds to step 205 and performs the bookmark setting for the corresponding page.

Meanwhile, in step 213 to which the media device proceeded as a result of the determination that the user's operation recognized in step 201 is not the operation of folding the currently displayed page, the media device determines whether the user's operation is an operation of unfolding a folded part of the currently displayed page. When it is determined that the user's operation is an operation of unfolding a folded part of the currently displayed page, the media device proceeds to step 215 and then releases the bookmark for the corresponding page. That is, when an arbitrary page is folded according to an embodiment of the present invention, it implies that the bookmark is set on the corresponding page.

In step 213, when the media device determines that the user's operation recognized in step 201 is not the operation of unfolding the folded part of the currently displayed page, i.e., that the recognized user's operation is not related to the bookmark setting, the media device proceeds to step 225 and performs a function corresponding to the recognized user's operation.

The bookmark setting method according to an embodiment of the present invention has been briefly discussed above.

Hereinafter, specific embodiments of the present invention will be described with reference to the related drawings.

Figure 3:
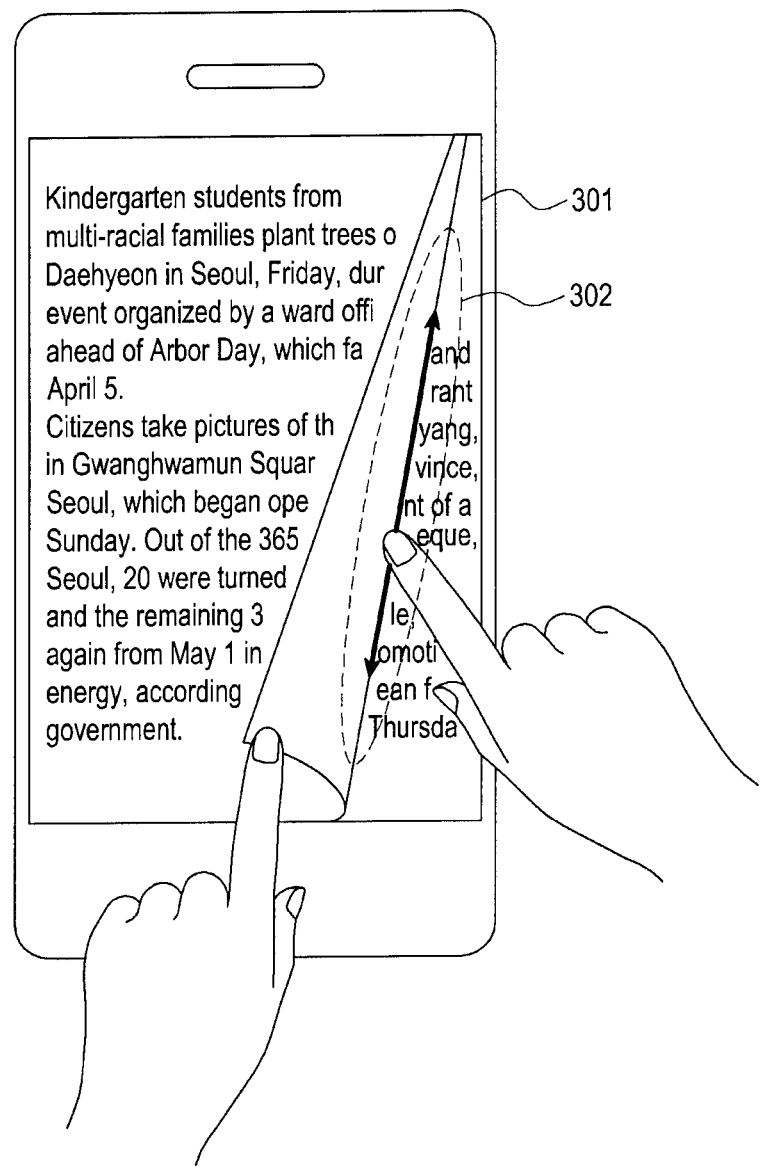
FIG. 3 is a diagram illustrating an example of a bookmark setting method according to an embodiment of the present invention.
Figure 4:
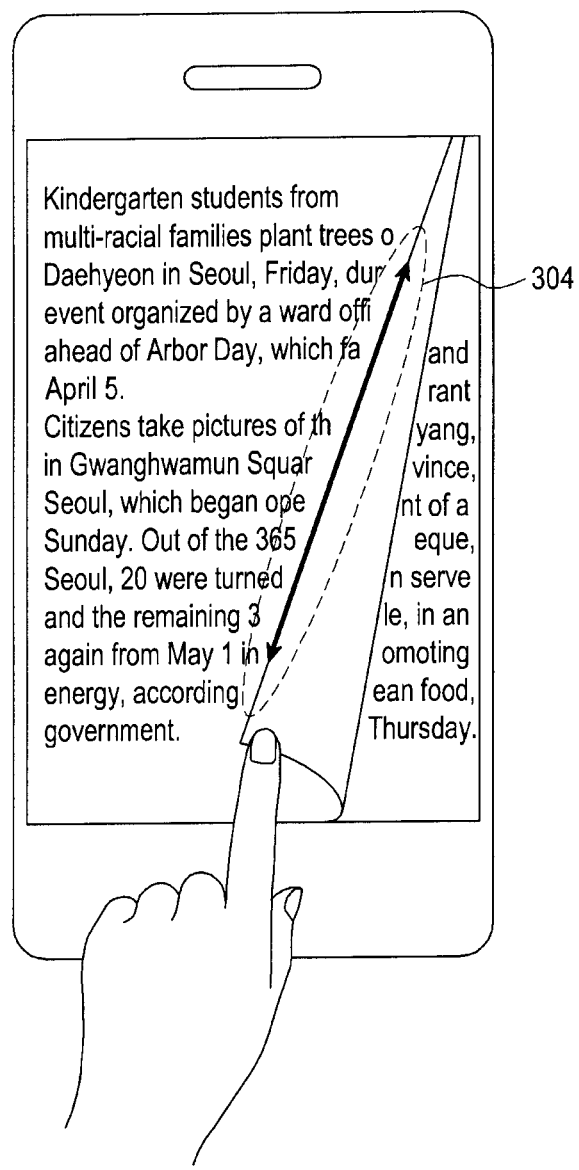
FIG. 4 is a diagram illustrating an example of a bookmark setting method according to another embodiment of the present invention.

FIGS. 3 to 5 are diagrams illustrating examples of a bookmark setting method according to embodiments of the present invention FIG. 3 is a diagram illustrating an example of a bookmark setting method according to an embodiment of the present invention using two fingers.

As shown in FIG. 3, the user may perform a turning operation of the currently displayed page by performing a swipe operation from a side of the currently displayed page in a display area 301 by using one finger. That is, when the swipe operation from a side of the currently displayed page is recognized, the media device performs the turning operation of the currently displayed page.

Meanwhile, when it is recognized that before the turning operation is completed, i.e., during the turning operation, the user performs another swipe operation, by using another finger, along a boundary area 302 between a part which is not turned yet and a part which is being turned in the currently displayed page, the media device determines that the corresponding page has been folded and sets the bookmark on the page. Note that another swipe operation can include a swipe in one direction only or both up and down directions.

Hereinafter, an expression of "during the turning operation" refers to the case in which the currently displayed page includes a part that has not been completely turned over, and an expression that "the turning operation is completed" refers to the case in which the displayed page has been converted to a next page. Further, it is noted that "another finger" can be of a first hand or a second hand.

Figure 1:
FIG. 1 is a diagram illustrating an example of a conventional bookmark method of an e-book.

As appreciated by those skilled in the art, the present invention has a merit in that the user can feel a real user experience by providing the same effect as that of the paper bookmark being set in a real book. Moreover, there is a merit in that a larger display area of the e-book can be secured because the display area for marking the special menu for the bookmark setting, which is required in the prior art as described above with reference to FIG. 1, is not required.

FIG. 4 is a diagram illustrating an example of a bookmark setting method according to another embodiment of the present invention using one finger.

As shown in FIG. 4, the user may perform a turning operation of the currently displayed page by performing a swipe operation from a side of the currently displayed page by using one finger. That is, when the swipe operation from a side of the currently displayed page is recognized, the media device performs the turning operation of the currently displayed page.

Meanwhile, when it is recognized that before the turning operation is completed, i.e., during the turning operation, the user performs another swipe operation at a speed above a preset speed along an edge area 304 of a part which is being turned in the currently displayed page, the media device determines that the corresponding page has been folded and sets the bookmark on the page. Note that swipe operation can include a swipe in one direction only or both up and down directions.

Herein, when the swipe operation is performed at a speed above a preset speed, it is determined that the corresponding page has been folded. It is because, for example, when a position of the user's finger moves up and down at the time of the swipe operation of turning the page, an edge part of the page is to be set to move up and down according to the movement of the finger's position. That is, it is because, even when the user moves one finger along the area 304 in order to set the bookmark, this movement may cause an effect of moving the edge of the turned part along the user's finger to be displayed, instead of being recognized as an operation for the bookmark setting.

For example, if it has been set that the swipe operation for turning the page can be recognized in the only left and right directions, whether the swipe operation is performed faster than the preset speed may be excluded from the conditions for determination. In this event, when a swipe operation in the substantially vertical direction is recognized, the media device may recognize the swipe operation as the operation for setting the bookmark on the corresponding page.

Figure 5A:
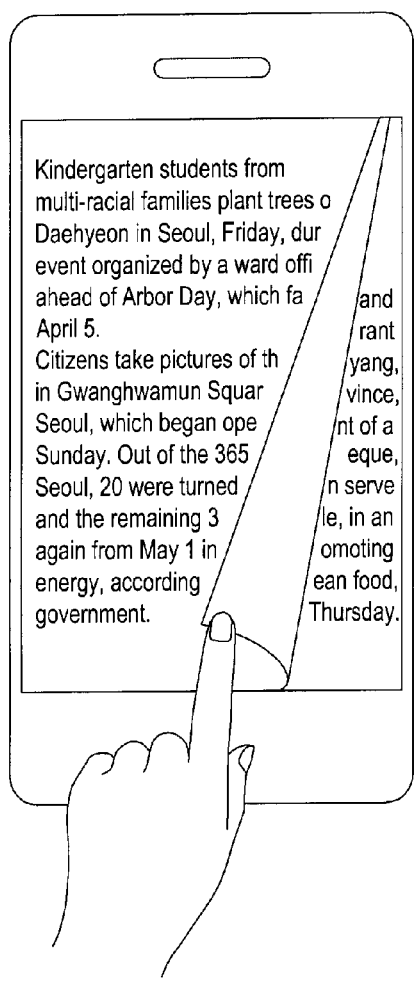
FIGS. 5A, 5B and 5C are diagrams illustrating examples of a bookmark setting method according to another embodiment of the present invention.
Figure 5B:
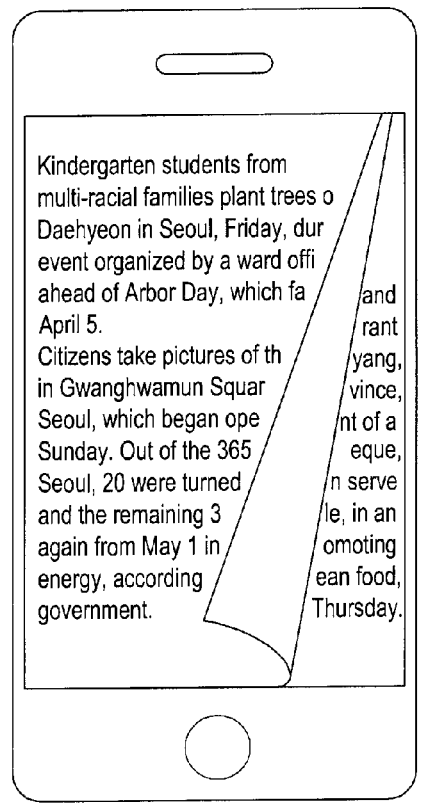
Figure 5C:
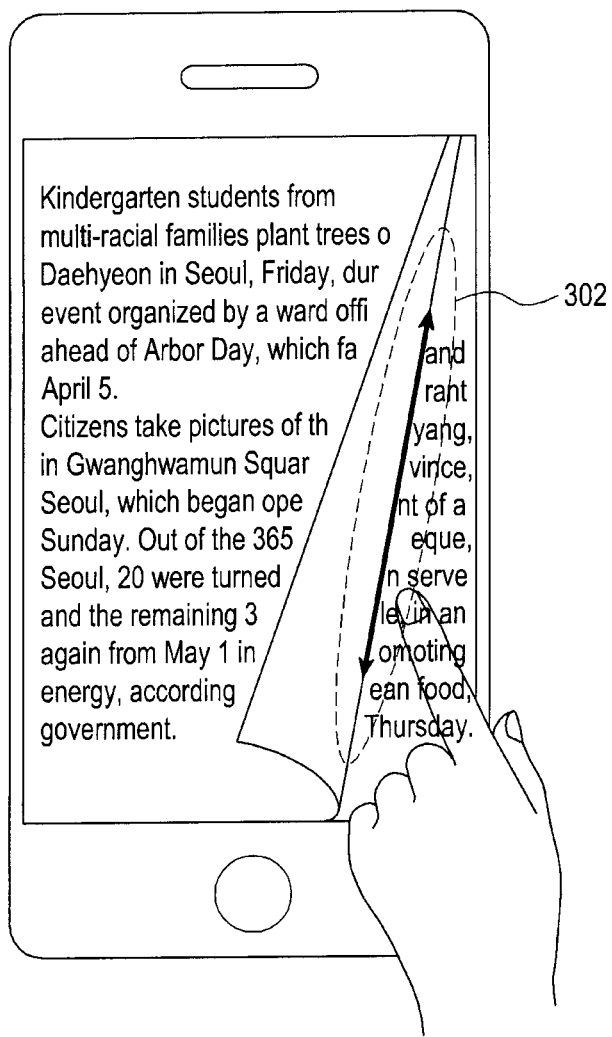

FIGS. 5A to 5C are diagrams illustrating examples for a bookmark setting method according to yet another embodiment of the present invention using one finger.

As described above with reference to FIG. 4, when the edge part of the currently displayed page has been set to move according to the position of the user's finger, the swipe operation in the vertical direction may not be recognized as an operation of folding the currently displayed page.

Accordingly, while the swipe operation of turning the currently displayed page is performed as shown in FIG. 5A, in the case in which the movement of the user's finger stops during more than a preset time in the specific area, the corresponding page is displayed in a turning operation state as shown in FIG. 5B when the user detaches the finger after the stopping.

Thereafter, when the swipe operation being performed along the area 302 is recognized as shown in FIG. 5C, the media device recognizes the swipe operation as an operation for the bookmark setting on the corresponding page. Note that swipe operation can include a swipe in one direction only or both up and down directions.

Figures 6A, 6B:
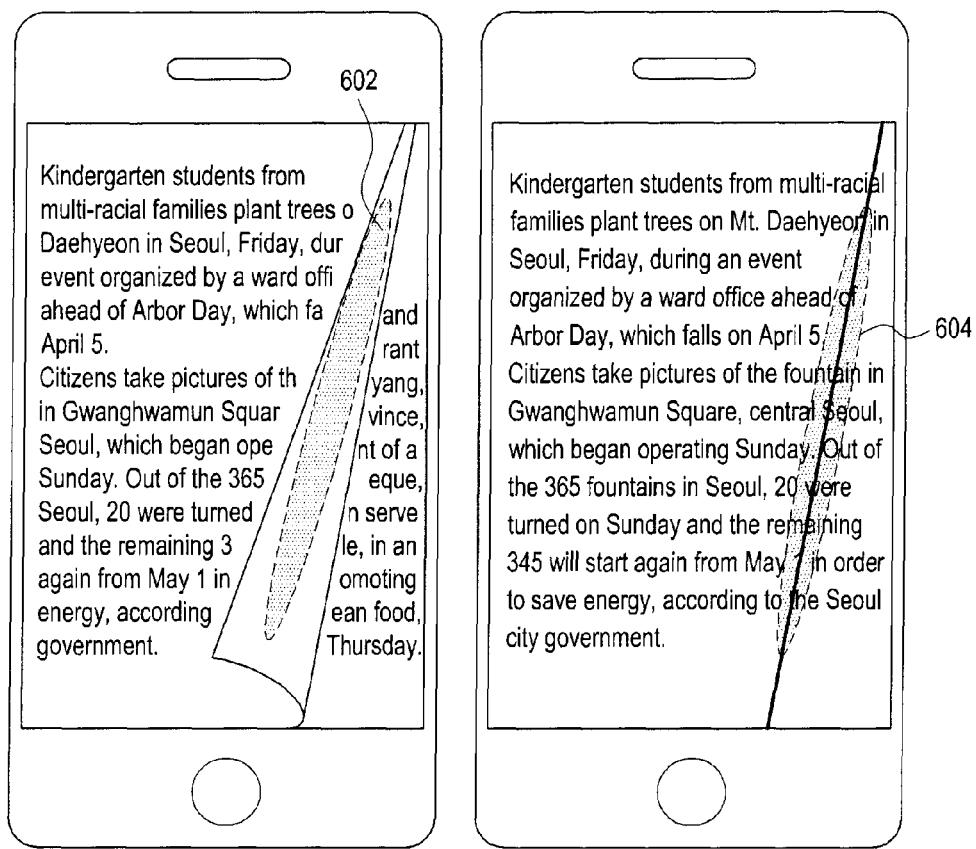
FIGS. 6A and 6B are diagrams illustrating examples of visual effects assigned on a page where a bookmark is set according to an embodiment of the present invention.

Meanwhile, when the bookmark has been set on a particular page, a visual effect in which a folded trace 602 remains on the folded part of the page where the bookmark has been set as shown in FIG. 6A may be provided. The visual effect may be implemented by, for example, a shaded indication. Further, when the folded part of the page where the bookmark has been set is unfolded, a visual effect in which a folded trace 604 remains as shown in FIG. 6B may be provided. Note that the same unfolded visual effects can be achieved in the previously described embodiments according to the teachings of the present invention.

According to the embodiments, the shaded indication may be marked on the entirety of the folded part or along the boundary of the folded part.

In this event, a shade concentration may be different according to the number of the swipe operations of the user at the time of the bookmark setting. For example, when the number of the swipe operations of the user at the time of the bookmark setting is one time, the shade concentration may be 20% and when the number of the swipe operations of the user at the time of the bookmark setting is two times, the shade concentration may be 40%.

The bookmark setting method according to embodiments of the present invention has been described above with reference to FIGS. 3 to 6B. Hereinafter, a bookmark releasing method according to embodiments of the present invention will be described with reference to FIGS. 7 and 8.

Figures 7A, 7B:
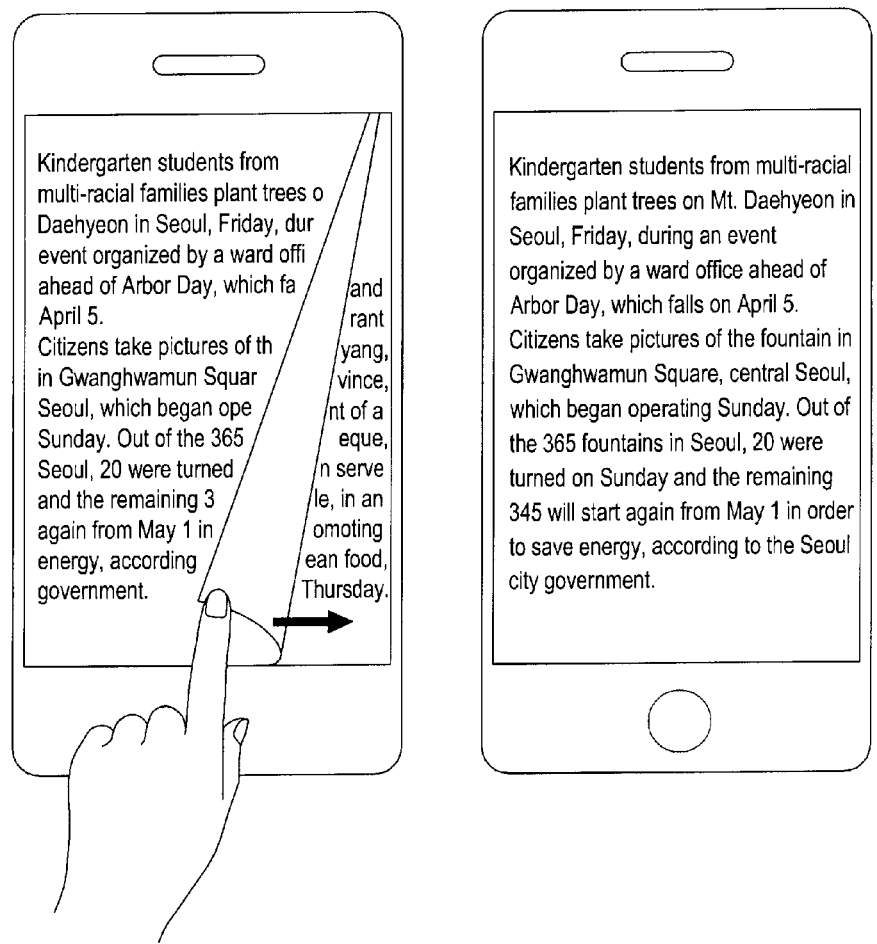
FIGS. 7A and 7B are diagrams illustrating an examples of a bookmark releasing method according to an embodiment of the present invention.

FIGS. 7A and 7B are diagrams illustrating examples for a bookmark releasing method according to an embodiment of the present invention. FIG. 7A illustrates a state in which the bookmark has been set, and FIG. 7B illustrates a state in which the bookmark has been released by unfolding the page where the bookmark is set.

In order to release a bookmark, a user may unfold a page where the bookmark has been set, through a swipe operation starting from an edge of a folded part of the page. In this event, the media device may determine that the bookmark on the corresponding page is released.

That is, when the folded part on the page where the bookmark is set is unfolded by the swipe operation of the user, the media device may release the bookmark on the corresponding page.

The present invention has a merit of causing the user to feel a real user experience by providing the same effect as that of releasing the paper bookmark in a real book.

Figure 8A:
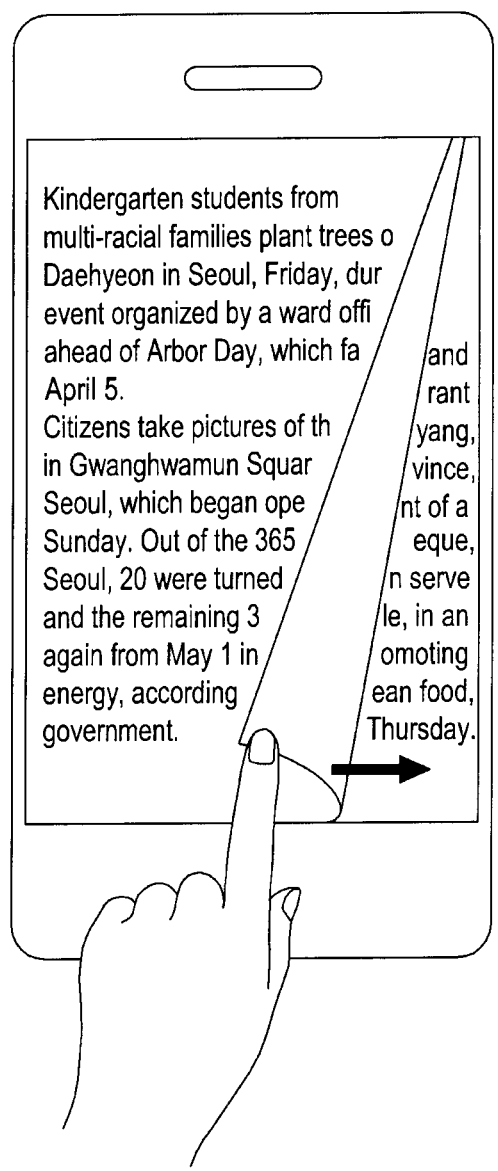
FIGS. 8A, 8B and 8C are diagrams illustrating examples of a bookmark releasing method according to another embodiment of the present invention.
Figures 8B, 8C:
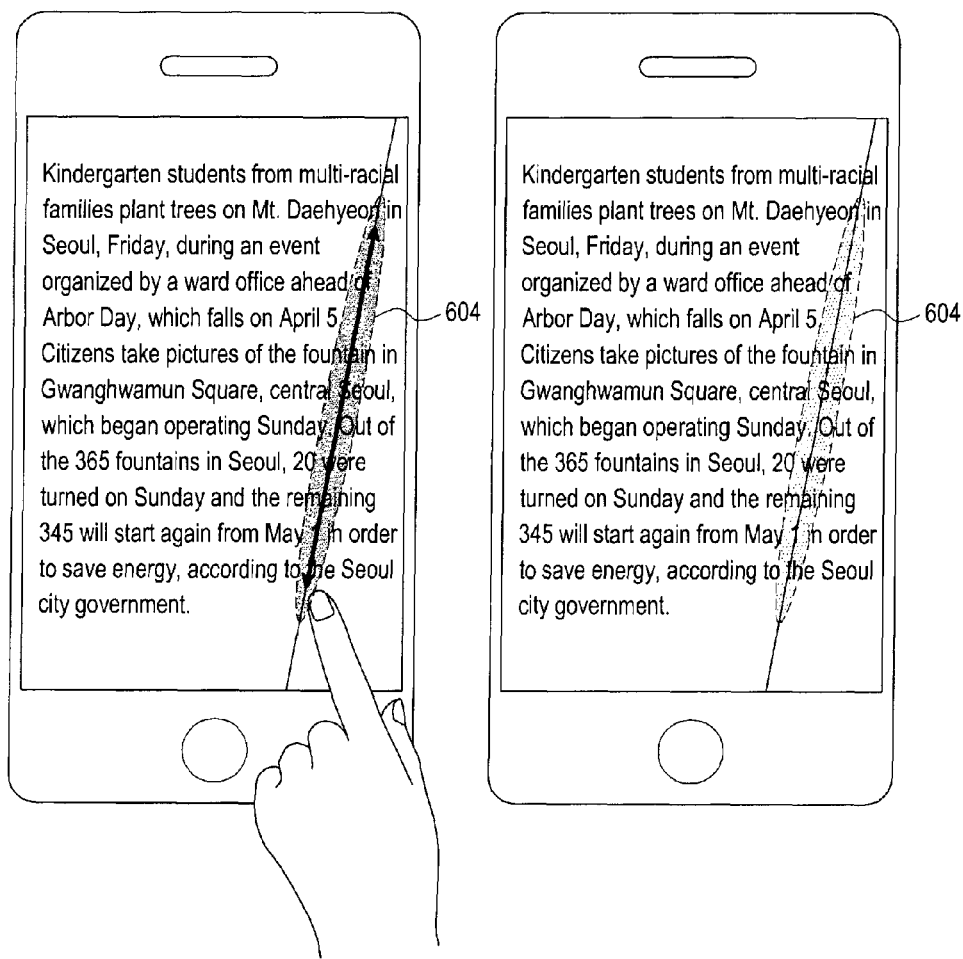

FIGS. 8A to 8C are diagrams illustrating examples for a bookmark releasing method according to another embodiment of the present invention. In particular, FIG. 8A illustrates a state in which the bookmark has been set, FIG. 8B illustrates a process of performing the swipe operation along the folded trace 604 in the state in which the folded part has been unfolded, and FIG. 8C illustrates a screen in which the folded part (or trace) 604 is displayed with a lower shade concentration since a smaller number of the swipe operations than the number of the swipe operations recognized at the time of the bookmark setting has been recognized.

As described above with reference to FIG. 6, when the folded trace such as the shaded indication or the like remains on the part where the bookmark is set, even though the user unfolds the folded part, the media device does not release the bookmark on the corresponding page immediately and when the user performs a swipe operation along the folded trace 604, the media device may make the bookmark be release. To this end, when it is recognized that the user performs the swipe operation along the folded trace 604 in the state of unfolding the folded part of the page where the bookmark is set, the media device may release the bookmark on the corresponding page.

Meanwhile, as described above with reference to FIGS. 6A and 6B, in the case of causing the effect display to be different according to the number of the user's swipes recognized at the time of the bookmark setting, for example, in the case of causing the shade concentration to be thick according to the number of the user's swipes recognized at the time of the bookmark setting, the bookmark on the corresponding page may be released according to the number of times of the swipe operation by the user in a state in which the folded part has been unfolded, or only different visual effects may be given in a state in which the bookmark has not been released.

For example, when a user has set a bookmark by performing the swipe operation twice, the shade concentration of the folded part on the corresponding page may be set to 40%. In this event, when the user performs the swipe operation only one time in the state in which the folded part of the corresponding page has been unfolded, only the shade concentration of the folded part may be lowered to 20% without releasing the bookmark on the corresponding page.

The bookmark releasing method according to the embodiment of the present invention has been described above with reference to FIG. 7A to FIG. 8C. Meanwhile, when the bookmark has been set, it is possible to provide a convenience to a user by further generating a bookmark list for the pages where the bookmarks have been set. Hereinafter, the method for generation the bookmark list on the pages where the bookmarks have been set will be described with reference to related drawings.

Figures 9A, 9B:
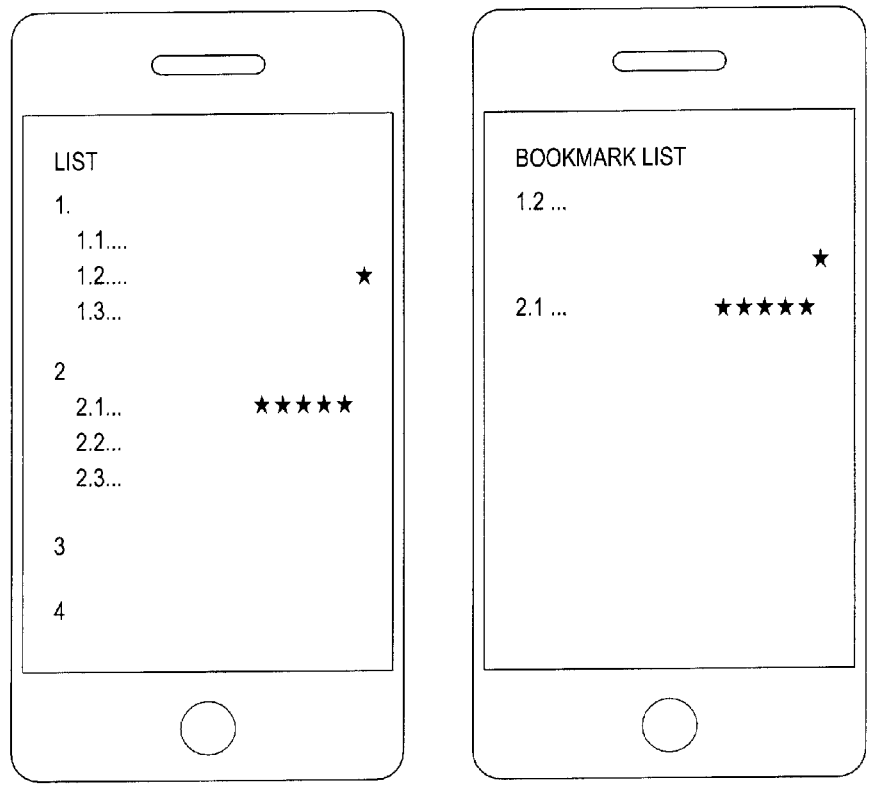
FIGS. 9A and 9B are diagrams illustrating examples of a bookmark list displaying method according to an embodiment of the present invention.

FIGS. 9A and 9B are diagrams illustrating examples for a bookmark list displaying method according to the embodiment of the present invention. In particular, FIG. 9A is an example illustrating that a bookmark list has been set in addition to a set e-book's list, and FIG. 9B is an example illustrating a separate list for displaying only the pages where the bookmarks have been set.

When bookmarks have been set for particular pages, a media device according to the embodiment of the present invention generates a bookmark list for the particular pages. In this event, generating the bookmark list may refer to displaying a list of pages where the bookmarks have been set in addition to an already set e-book's list or generating a separate list for displaying only the pages where the bookmarks have been set.

In operation, when the bookmark list as described above is output, different effects may be given according to a priority of a corresponding page. For example, as shown in FIGS. 9A and B, when a priority of a page is high, the bookmark list is displayed with five stars additionally marked on the page. In contrast, when a priority of a page is low, the bookmark list is displayed with one star additionally marked on the page.

In the embodiment, a priority of a page where the bookmark has been set may be changed based on the number of the user's swipes performed at the time of the bookmark setting. For example, in the case of dividing a priority into five steps, when the number of the user's swipes performed at the time of the bookmark setting is only one time, it is possible to set a priority of a page to the lowest value, 1, and when the number of the user's swipes performed at the time of the bookmark setting is five times, it is possible to set a priority of a page to the highest value, 5. The priority may be displayed in the form of a character or an image.

Similarly, the priority of the page where the bookmark has been set may be changed according to the number of user swipes along the folded part on the page where the bookmark has been set. For example, when the user performs the swipe operation one time along the folded trace of the corresponding page in the state in which the folded part of the page where the priority is set to 5 has been unfolded, the priority of the corresponding page may be set to 4 by lowering the priority by one level. Then, the media device according to the present invention changes the priority indication displayed in the bookmark list and then outputs the changed priority indication. Further, the media device changes the visual effect of the folded trace depending on the priority, e.g., the shade concentration of the shaded indication and outputs the changed visual effect. In this event, when the priority is set to 0, the bookmark on the corresponding page may be released.

Meanwhile, in the state in which the folded part on the page where the bookmark is set has been unfolded, when the user performs the turning operation of the corresponding page and then the next page is displayed, it is possible to set whether to change or maintain the bookmark setting on the page where the turning operation has been performed. For example, when the turning operation on the corresponding page is completed in the state the folded part on the page where the bookmark is set has been unfolded, the media device may release the bookmark on the corresponding page.

Further, when the turning operation about the corresponding page is completed in the state in which the folded part on the page where the bookmark is set has been unfolded, the media device may reduce the priority of the corresponding page by one level in the state where the bookmark on the corresponding page has been maintained.

Further, when the turning operation about the corresponding page is completed in the state in which the folded part on the page where the bookmark is set has been unfolded, the media device may maintain the bookmark and priority of the corresponding page without change.

In the case of maintaining the bookmark with reference to the embodiments as described above, the corresponding page may be displayed in the folded state at the time when the corresponding page is displayed later.

Meanwhile, when the user unfolds the folded part on the page where the bookmark has been set and an operation of folding the corresponding page again is then recognized, the media device may increase the priority of the corresponding page by one level.

When the bookmark has been set, it is possible to notify the user that there is a page where the bookmark has been set, when another page is displayed. Hereinafter, a method of displaying a bookmark image representing that there is a page where the bookmark has been set will be described with reference to the related drawings.

Figures 10A, 10B:
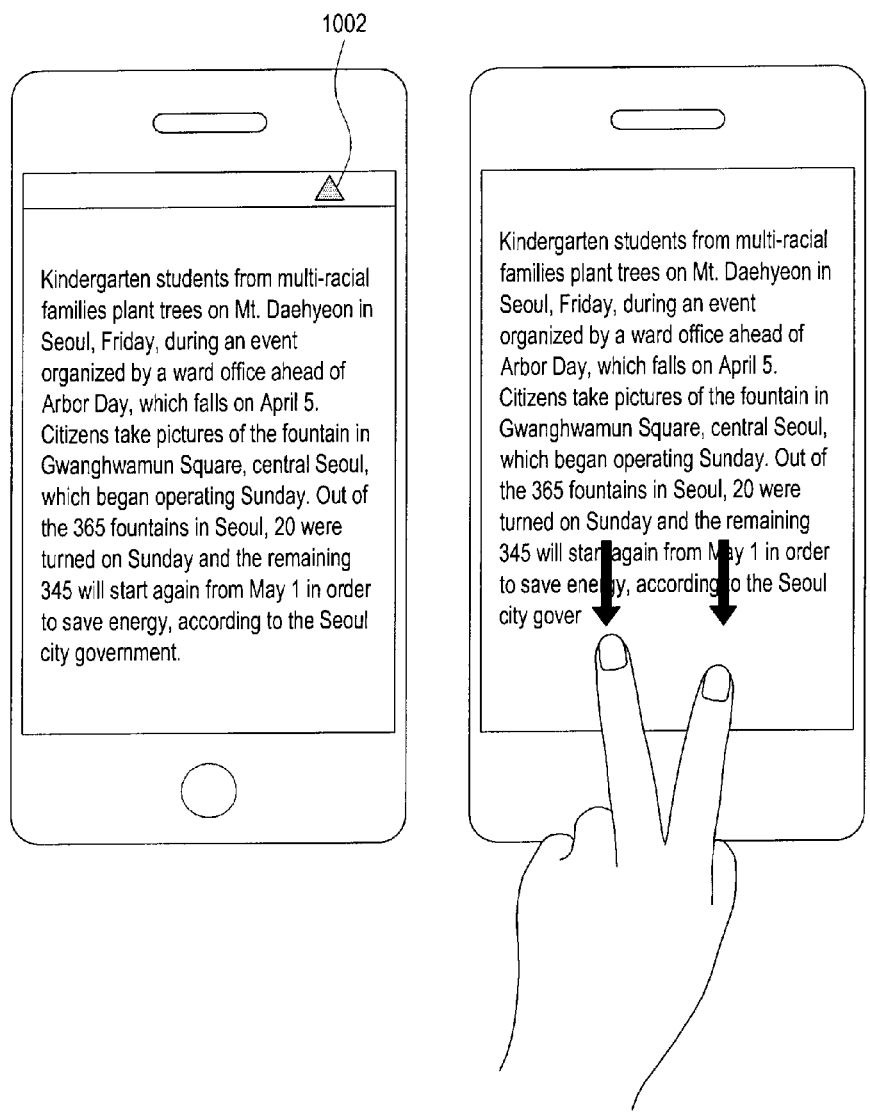
FIGS. 10A, 10B and 10C are diagrams illustrating examples of a bookmark image outputting method according to an embodiment of the present invention.
Figure 10C:
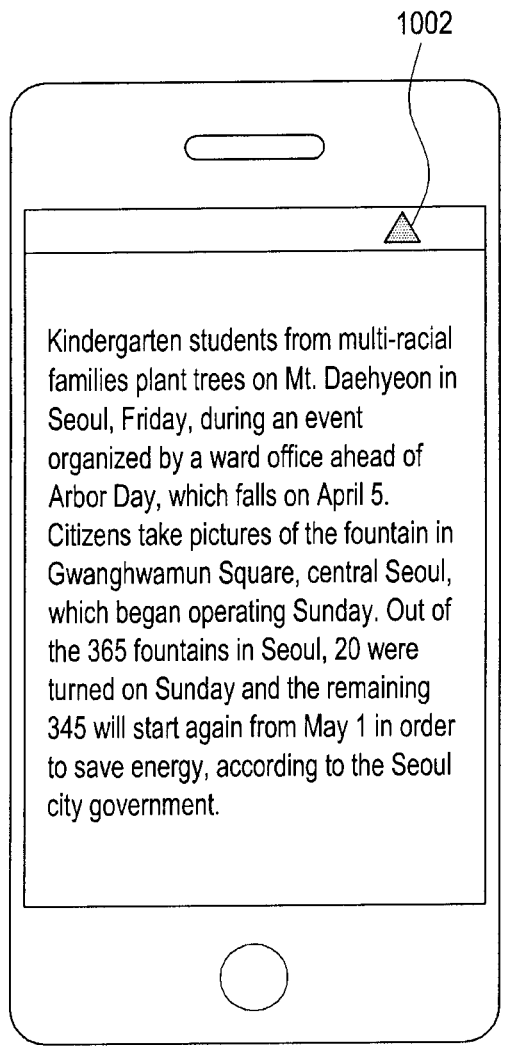

FIG. 10A is a view for describing an example of a bookmark image outputting method according to an embodiment of the present invention. It is noted from FIG. 10A that a bookmark image 1002 representing that there is a page where the bookmark has been set is marked on one side of the currently displayed page. In this event, the user may move to the corresponding page where the bookmark has been set by touching the bookmark image 1002. That is, when the user's operation of touching the bookmark image 1002 is recognized, the media device according to the present invention displays the page where the bookmark has been set.

In an alternate embodiment, when the user's operation of moving the currently displayed page into a side of the display area is recognized, it is possible to display the book image on the side of the currently displayed page. For example, as shown in FIG. 10B, when an operation in which the user swipes in a downward direction of a screen by using two fingers is recognized, the media device may slightly move the currently output page in a downward direction, and may then display the page with the bookmark image 1002 of the corresponding page displayed on the page.

In the two embodiments described above, when there are plural pages where the bookmark has been set, either all bookmark images corresponding to the pertinent pages may be displayed in sequence or only one bookmark image may be displayed while a closest next page where the bookmark has been set is displayed whenever a user's operation of touching the bookmark image is recognized.

Meanwhile, when a plurality of e-books are stored in the media device, the media device may let user know the stored e-books by displaying covers of the e-books. This will be described with reference to FIG. 11.

Figure 11:
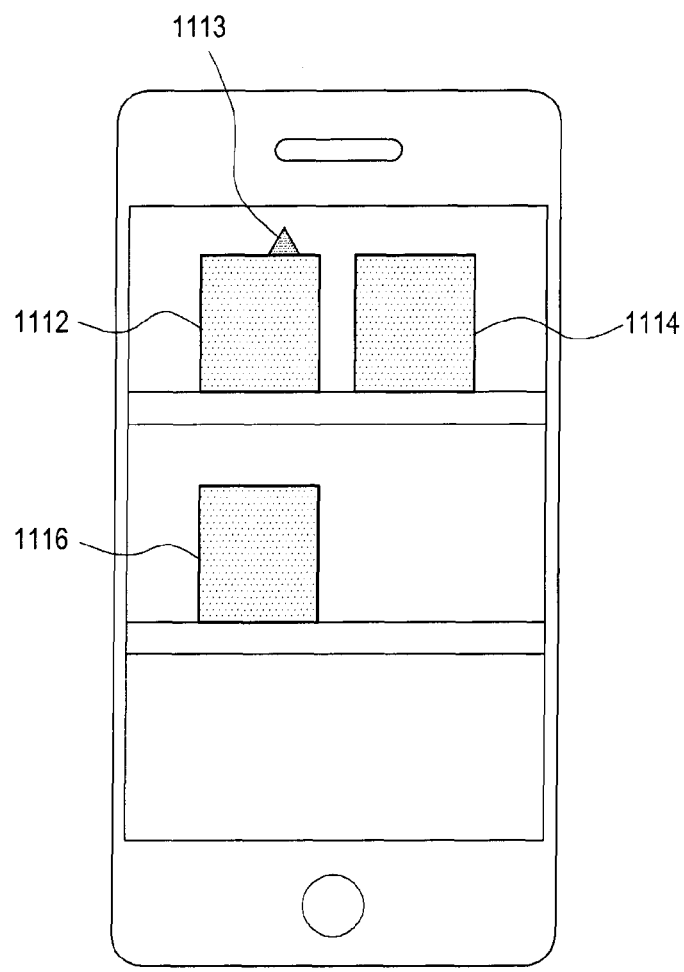
FIG. 11 is a diagram illustrating an example of a method for marking an e-book where a bookmark is set according to an embodiment of the present invention.

Referring to FIG. 11, it is noted that a plurality of e-books 1112, 1114, and 1116 are displayed in the display area. That is, the media device may display the stored e-books by displaying the covers of the stored e-books. Here, when there is an e-book where the bookmark has been set, the bookmark 1113 may be displayed on one side of the corresponding e-book 1112. As a result, the user may recognize that the bookmark is marked on one e-book 1112 among the three e-books 1112, 1114, and 1116 which are displayed.

Figure 12:
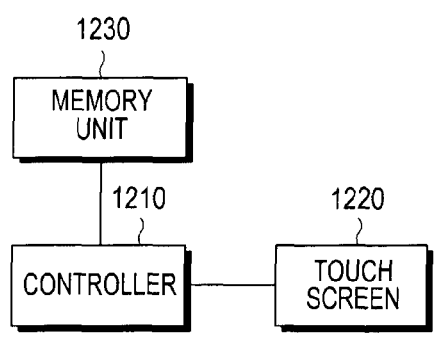
FIG. 12 is a block diagram illustrating a bookmark setting apparatus according to embodiments of the present invention.

FIG. 12 is a block diagram illustrating a bookmark setting apparatus according to embodiments of the present invention. Referring to FIG. 12, the bookmark setting apparatus according to embodiments of the present invention includes a controller 1210, a touch screen 1220, and a memory unit 1230.

In operation, the controller 1210 recognizes the user's operation according to a signal input from the touch screen 1220. In particular, the controller 1210 recognizes whether an operation performed by the user is a swipe operation for setting and releasing a bookmark based on the signal input from the touch screen 1220.

Further, when the user's operation to set the bookmark on the currently displayed page based on the signal input from the touch screen 1220 is recognized, the controller 1210 sets the bookmark on the corresponding page.

That is, when the swipe operation from a side of the currently displayed page is recognized and the swipe operation along a boundary between a part which has not been turned yet and a part which is being turned in the corresponding page is recognized before the turning operation of the corresponding page is completed, the controller 1210 sets the bookmark on the corresponding page.

In this event, a priority of the corresponding page may be set according to the number of swipe operations performed along the boundary and the number of swipe operations performed along the boundary is stored in the memory unit 1230.

Further, the controller 1210 may generate a bookmark list for the pages where the bookmarks have been set. The bookmark list may be additionally displayed in a set e-book's list or be generated as a separate list. When the list is output, the priority of the corresponding page may be displayed together with the list.

Meanwhile, when the swipe operation for unfolding the folded part of the page where the bookmark has been set is recognized, the controller 1210 according to the embodiment may release the bookmark on the corresponding page. When the swipe operation along the folded part of the page where the bookmark has been set is recognized, the controller 1210 according to the embodiment may release the bookmark on the corresponding page. When the priority of the page where the bookmark is set has been set, i.e., when as many operations of swiping the folded trace are recognized as the number of the swipe operations performed at the time of the bookmark setting, the controller 1210 according to the embodiment may release the bookmark on the corresponding page. When the operation of swiping the folded trace is recognized by a number of times, which is less than the number of the swipe operations performed at the time of the bookmark setting, it is possible to lower only the priority of the corresponding page in the state in which the bookmark on the corresponding page has not been released. In this event, when the priority of the corresponding page is 0, the bookmark for the corresponding page may be released.

Meanwhile, the controller 1210 may display the bookmark image representing that there is a page where the bookmark has been set, on one side of the currently output page. When there are a plurality of pages where the bookmark has been set, the controller 1210 may display the bookmark images of the respective pages in a row or may display only one bookmark image.

In the case in which bookmark images are displayed in a row, when an operation that a user touches a bookmark image among the bookmark images is recognized, the controller 1210 outputs a page corresponding to the bookmark image. In the case in which only one bookmark image is displayed, when an operation that a user touches any of the bookmark image is recognized, the controller 1210 outputs the next page where the bookmark closest to the present page has been set.

The touch screen 1220 displays the e-book in the set display area. Further, the touch screen 1220 detects a part which the user has touched, generates a signal based on the detected information, and then outputs the signal to the controller 1210. Further, the touch screen 1220 outputs various characters and images according to a control signal output from the controller. For example, the touch screen 1220 outputs an image of a page being turned, a bookmark image, and a character and an image related to the bookmark list.

The memory unit 1230 stores the various e-books. In particular, the memory unit 1230 stores the number of times by which swipe operations performed at the time of the bookmark setting has occurred, in accordance with the corresponding page. According to the embodiment, the memory unit 1230 stores the number of times by which swipe operation performed at the time at which the bookmark setting has occurred, in accordance with a priority of the corresponding page. Further, when the user's swipe operation is recognized in the state in which the folded part of the page where the bookmark is set has been unfolded, the memory unit 1230 reduces the priority of the corresponding page by one level under the control of the controller 1210.

According to the embodiments of the present invention as described above enable a user to do a bookmark setting and releasing in a simpler and easier manner. Moreover, the embodiments of the present invention provide a more practical interface to the user, thereby enhancing the user's experience. Further, according to the embodiments of the present invention, it is possible to easily and intuitively know that there is a page where the bookmark has been set and to rapidly shift to the corresponding page.

The above-described methods according to the present invention can be implemented in hardware, firmware or as software or computer code that can be stored in a recording medium such as a CD ROM, an RAM, a floppy disk, a hard disk, or a magneto-optical disk or computer code downloaded over a network originally stored on a remote recording medium or a non-transitory machine readable medium and to be stored on a local recording medium, so that the methods described herein can be rendered in such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein.

While the preferred embodiments of the present invention have been illustrated and described, it will be understood by those skilled in the art that various changes and modifications may be made, and equivalents may be substituted for elements thereof without departing from the true scope of the present invention. In addition, many modifications may be made to adapt to a particular situation and the teaching of the present invention without departing from the central scope. Therefore, it is intended that the present invention not be limited to the particular embodiment disclosed as the best mode contemplated for carrying out the present invention, but that the present invention include all embodiments falling within the scope of the appended claims.

What is claimed is:

1. A method of setting a bookmark of an e-book, the method comprising:
   displaying the e-book on a touchscreen;
   detecting an operation folding a displayed page of the displayed e-book including a first swipe operation along a boundary between unfolded and folded parts of the displayed page; and setting the bookmark on the displayed page in response to the operation folding the displayed page,
wherein the folded part of the displayed page is displayed with different shades according to a number of recognized swipe operations detected along the boundary when the bookmark is set.

2. The method of claim 1, further comprises:
releasing the bookmark of the displayed page according to an operation unfolding a folded part of the displayed page, or
releasing the bookmark of the displayed page when a second swipe operation is detected along a folded trace of the displayed page corresponding to the boundary after the operation unfolding the folded part of the displayed page.

3. The method of claim 1, further comprising:
generating a bookmark list representing bookmarked pages where bookmarks are set.

4. The method of claim 3, further comprising:
setting a priority for each of the bookmarked pages based on the number of recognized swipe operations detected when setting a respective bookmark for each of the bookmarked pages; and
displaying a priority for each of the bookmarked pages when displaying the bookmark list.

5. The method of claim 4, further comprising:
detecting the unfolding operation unfolding the folded part of the displayed page; and
detecting at least one second swipe operation along a folded trace corresponding to the boundary of the displayed page and reducing the priority for a respective displayed page based on a number second swipe operations detected.

6. The method of claim 4, further comprising:
reducing the priority of the displayed page by one level when the folded part of the displayed page is unfolded and the displayed page is turned to a next page.

7. The method of claim 5, further comprising:
releasing the bookmark of the bookmarked page when the priority of the bookmarked page is less than a critical value.

8. The method of claim 4, further comprising:
increasing the priority of the bookmarked page by one level in response to detecting the unfolding operation unfolding the folded part of the displayed page is recognized and a refolding operation refolding the displayed page.

9. An apparatus for setting a bookmark of an e-book, comprising:
a touch screen; and
a controller configured to:
display the e-book on the touch screen and detecting an operation folding a currently displayed page of the displayed e-book including a first swipe operation along a boundary between unfolded and folded parts of the displayed page; and
set the bookmark on the currently displayed page in response to the operation folding the currently displayed page, and
wherein the folded part of the displayed page is displayed with different shades according to a number of recognized swipe operations detected along the boundary when the bookmark is set.

10. The apparatus of claim 9, wherein the controller further configured to release the bookmark of the displayed page according to an operation unfolding a folded part of the displayed page or release the bookmark of the displayed page when a second swipe operation is detected along a folded trace of the displayed page corresponding to the boundary after the operation unfolding the folded part of the displayed page.

11. The apparatus of claim 9, wherein the controller further configured to generates a bookmark list representing the displayed page where the bookmark is set.

12. The apparatus of claim 9, wherein the controller further configured to set a priority of the displayed page based on a number of recognized first swipe operations detected when setting the bookmark for the displayed page.

13. The apparatus of claim 12, wherein the controller further configured to:
detects the unfolding operation unfolding the folded part of the displayed page; and
detects at least one second swipe operation along a folded trace corresponding to the boundary of the displayed page and reduces a priority of the displayed page based on a number of second swipe operations detected.

14. The apparatus of claim 12, wherein the controller further configured to reduces the priority of the displayed page by one level when the folded part of the displayed page is unfolded, and the displayed page is turned to a next page.

15. The apparatus of claim 13, wherein the controller further configured to releases the bookmark of the displayed page when the priority of the displayed page is less than a critical value.

16. The apparatus of claim 12, wherein the controller further configured to increases the priority of the displayed page by one level in response to detecting the operation of unfolding the folded part of the displayed and a refolding operation of refolding the displayed page.

* * * * *